United States Patent [19]

Briggs et al.

[11] 4,264,954
[45] Apr. 28, 1981

[54] DISTRIBUTED FUNCTION COMMUNICATION SYSTEM FOR REMOTE DEVICES

[75] Inventors: Barry D. Briggs, Cambridge, Ohio; George C. Beason, Acton, Mass.

[73] Assignee: NCR Corporation, Dayton, Ohio

[21] Appl. No.: 71,896

[22] Filed: Sep. 4, 1979

[51] Int. Cl.³ .............................................. G06F 3/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,297,994 | 1/1967 | Klein | 364/200 |
| 3,544,976 | 12/1970 | Collins | 364/200 |
| 3,648,252 | 3/1972 | Thron et al. | 364/200 |
| 3,676,846 | 7/1972 | Busch | 364/200 |
| 3,702,462 | 11/1972 | England | 364/200 |
| 4,091,448 | 5/1978 | Clausing | 364/200 |

*Primary Examiner*—Gareth D. Shaw
*Assistant Examiner*—Thomas M. Heckler
*Attorney, Agent, or Firm*—J. T. Cavender; Wilbert Hawk, Jr.; Richard W. Lavin

[57] ABSTRACT

To effect an accurate transmission of data between processing equipment and a plurality of peripheral devices, first and second interfaces are employed for reconstructing and transmitting the data over a communications link such as a conductor pair. The first interface termed a master terminal which is coupled to a common control module by way of a common control bus, receives instruction, address, and data information from the processor, and transmits a serial data code containing all this information to a plurality of second interfaces, termed slave terminals. Each slave terminal is coupled to a set of peripheral devices by a common bus and when a peripheral device recognizes its address being present in the code received from the master terminal, the slave terminal responds to complete the transaction with the master terminal and the addressed peripheral device.

16 Claims, 12 Drawing Figures

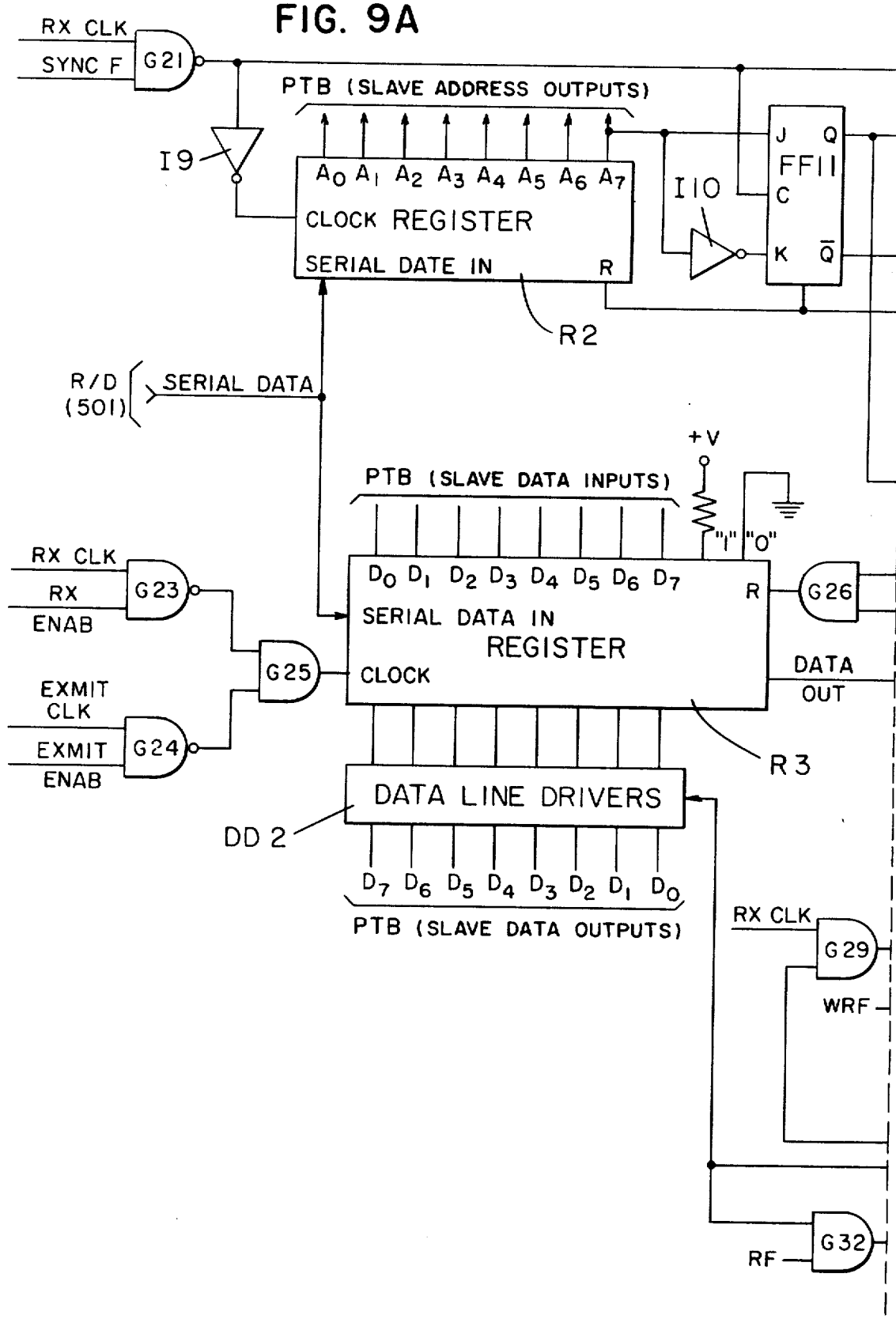

DISTRIBUTED FUNCTION COMMUNICATION SYSTEM FOR REMOTE DEVICES

This is a continuation of application Ser. No. 817,780 filed, July 21, 1977 abandoned.

FIELD OF THE INVENTION

The present invention relates to a communication system, especially one designed for transmitting data over a common bus between the common control processor of a data processing system and a plurality of terminal devices which may be remotely located with respect to the processor.

BACKGROUND OF THE INVENTION

In present day data processing and transmission systems, it is common practice to assign a common control processor the task of processing data received from and to be transmitted to a plurality of terminal equipment disposed at a plurality of locations which may be remotely located with respect to the processor. Such terminal equipment typically includes keyboard devices, numeric displays, operator displays, printers, cash drawers, etc., as common equipment at point of sales terminals. Transactions carried out by such terminal equipment require the exchange of data between the remote equipment and the processor, with real-time data handling.

In systems employing a common bus for transmission of serialized data, there has been a practical limit to the degree of remoteness or physical separation of the terminal equipment from the processor due to influences such as noise induced signal degradation, lack of drive, etc. Furthermore, confinement of all processing and memory to the processor not only makes data handling and processing entirely dependent upon the processor, but also reduces the speed at which transactions can be processed.

BRIEF SUMMARY OF THE INVENTION

In accordance with the present invention, there is provided a distributed function communication system wherein data is transmitted between a processor and a plurality of intermediate equipment terminals, hereinafter referred to as master terminals. Each master terminal has the responsibility of controlling the exchange of data between the processor and plural remote terminals, hereinafter referred to as slave terminals. Data transmitted from the processor is retimed at the master terminals so that, to the slave terminals, it appears to have originated at the processor; namely, to the slave terminals, the master terminals which control their operation are transparent. By compensating for timing errors resulting from data transmission, as well as providing drive, the master terminals enable data to be transmitted over distances normally considered prohibitive.

Each master terminal is provided with memory and its own common control microprocessor module. In addition, at each master terminal there may be provided plural peripheral devices, like those at the slave terminals. Polling of the peripheral equipment from the processor is effected by using protected and non-protected addresses transmitted serially over the common bus. The protected addresses are used for system addresses and local peripheral device addresses at the master terminals, while non-protected addresses are reserved for peripheral devices at the remote slave terminals.

Protocol logic is defined by the control circuitry within each master terminal which is constructed to inhibit data processing to ensure correct timing of the data. If the common control module (CCM) is ready for the next transaction, the control circuitry compares the current CCM state with the current data serialization logic state and either inhibits future processing by the CCM or times in the data to the CCM; serialization will also be permitted if commonality is allowed. The control circuitry also provides synchronization and includes registers to store the states of various parts of the logic. The memory within each master serves the master terminal itself and a plurality of peripheral devices located at the slave locations controlled by the master terminal, thus affording greater utilization of system memory, and taking advantage of common control coding. No memory is required at the slave terminals.

BRIEF DESCRIPTION OF THE DRAWINGS

FIGS. 9A and 9B, taken together, are a schematic diagram of the control circuit of the slave bus adapter of FIG. 5.

DETAILED DESCRIPTION

Figure 1:
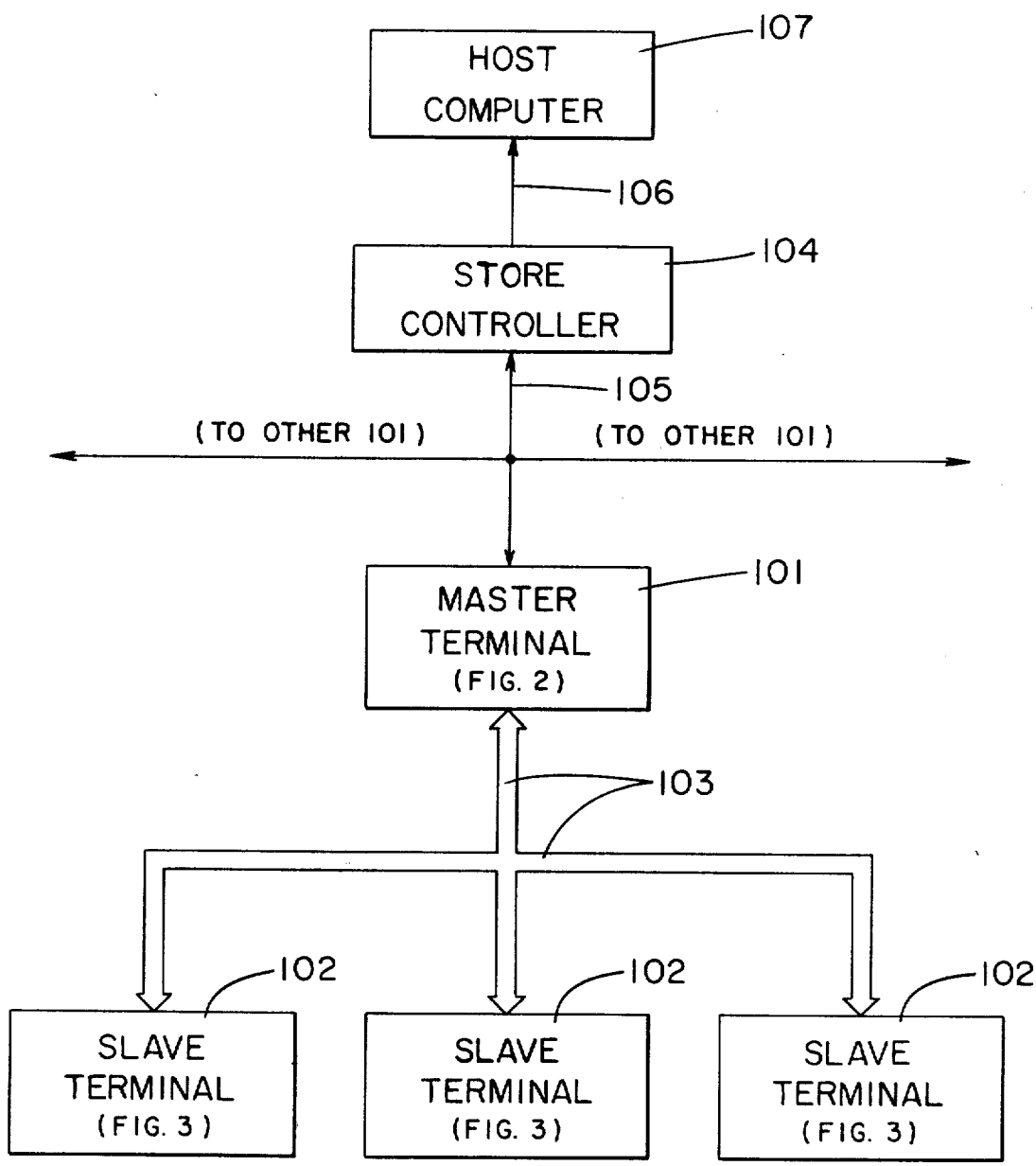
FIG. 1 is a general system diagram of a distributed terminal communication system.

The basic system configuration of the master-slave distributed function communication system is illustrated in FIG. 1. The general data processing equipment includes the usual host computer 107 connected by way of communication lines 106 to a store controller 104. Disposed at a plurality of locations remote from the computer 107 are peripheral devices, such as keyboard input devices, displays, etc., shown in FIG. 3, which require data transmission between themselves and data processing equipment. In accordance with the present invention, between the data processing equipment and the peripheral devices there are provided a master terminal 101, a plurality of associated slave terminals 102, and a master-slave communication link 103. For purposes of simplification, FIG. 1 depicts only a single master terminal 101 linked to three slave terminals 102. Suffice it to say that more or less than three slave terminals 102 may be associated with a single master terminal 101 via M/S link 103 and the number of master terminals 101 which communicate with the store controller 104 by communication lines 105 will likewise vary according to the overall size of the system and the amount of peripheral equipment to be serviced by the data processing equipment.

Figure 2:
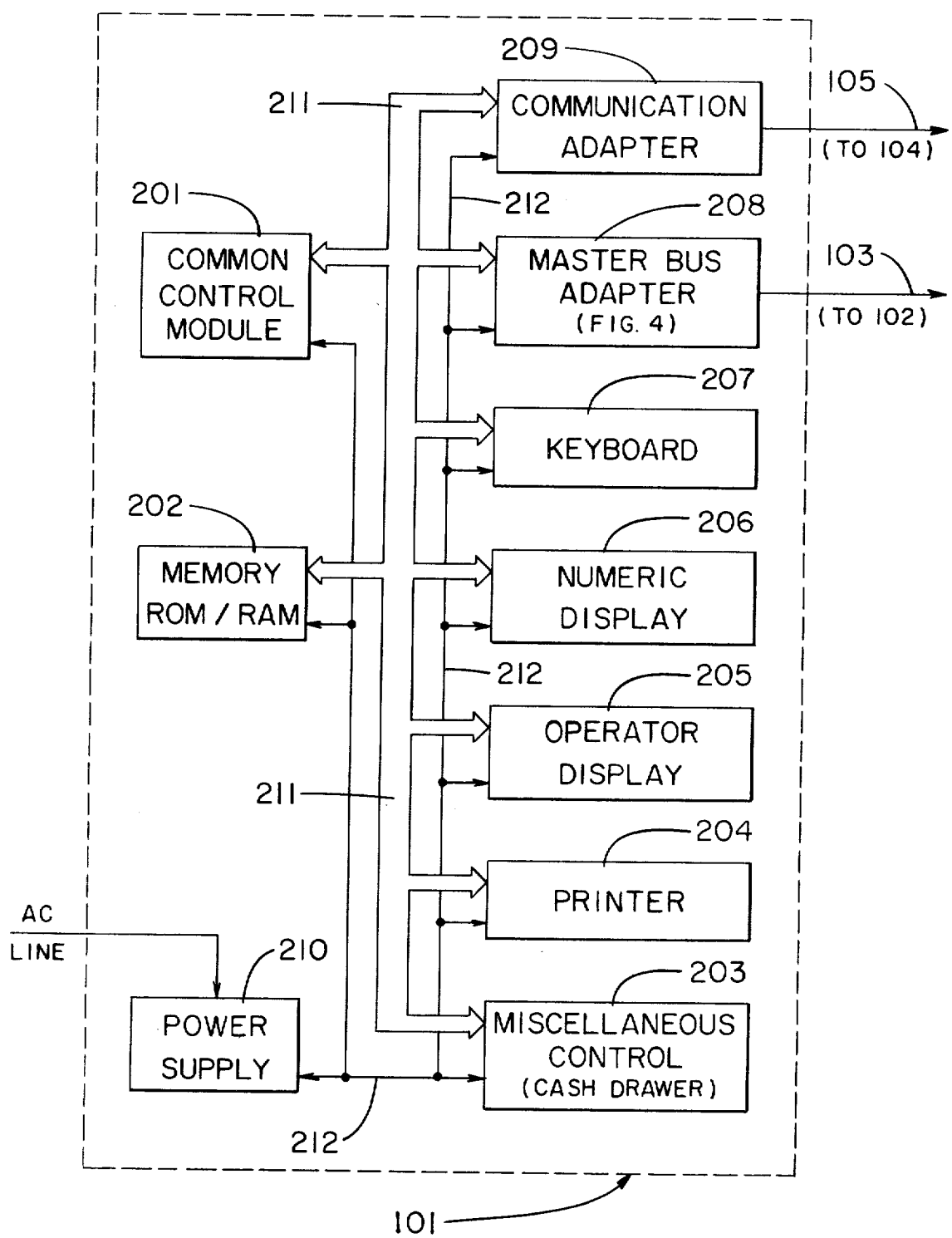
FIG. 2 is a basic block diagram of the constituent components of a master terminal of the system of FIG. 1.

As is shown in FIG. 2, each master terminal 101 consists of its own memory 202 which includes conventional ROM and RAM structure and a common control module (CCM) 201 connected with each other and with other components of the terminal over a common control bus 211. The master terminal may include its own peripheral devices such as a keyboard 207, numeric display 206, operator display 205, printer 204, and a miscellaneous control device 203, such as a cash drawer. Data transmission with the computer 107 is effected through a communication adapter 209, whereas data transmission between the master 101 and slave 102 terminals takes place by way of a master bus adapter 208, the details of which will be described below. Power for these components is supplied over power bus 212 from power supply 210. Such master terminal peripheral devices are conventional, employing a data register, status register, and an output buffer. The common control module 201 contains a microprocessor, such as an Intel 8080 microprocessor. Since those skilled in the art are familiar with the construction and operation of various types of common bus communication adapters and peripheral equipment, a detailed description of the same will be omitted; this equipment will only be briefly referred to hereinafter where necessary to facilitate the description of the communication system of the invention. Of course, details of the structure and operation of the master bus adapter 208, which controls data communication with the associated slave terminals 102, will be described below in connection with FIGS. 4 and 6 through 8.

Figure 3:
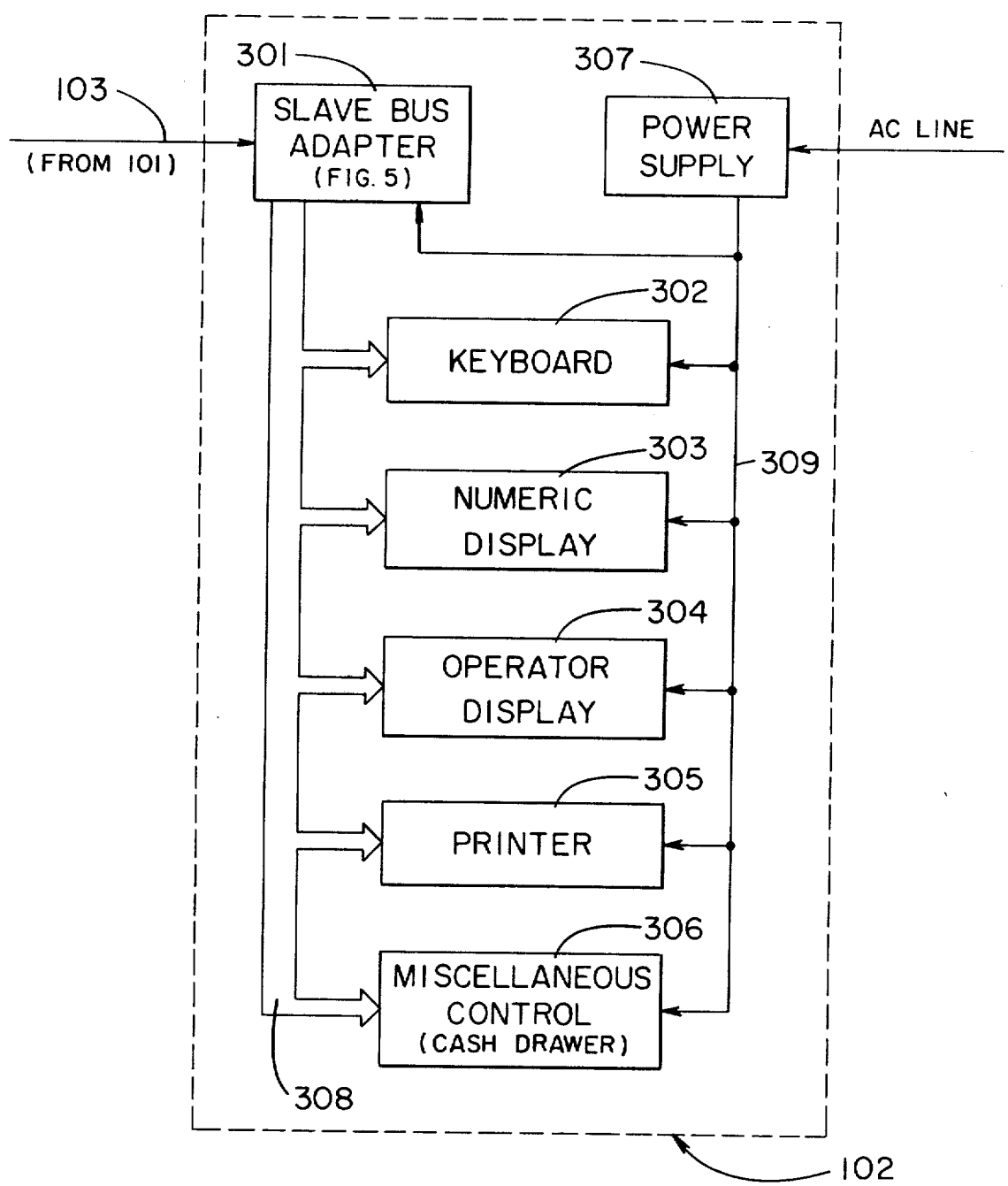
FIG. 3 is a basic block diagram of the constituent components of a slave terminal of the system of FIG. 1.

Referring now to FIG. 3, each slave terminal 102 consists of a slave bus adapter 301 which communicates with an associated master bus adapter (such as adapter 208 in FIG. 2) over a communications link such as a 100Ω twisted pair line 103. Within each slave terminal there are a plurality of remote (in the sense of the processor) peripheral devices such as a keyboard 302, numeric display 303, operator display 304, printer 305, and a miscellaneous control device 306 (such as a cash drawer). Such peripheral devices are connected with the slave bus adapter 301 by way of common control bus 308. Power supply 307 supplies power for the components of the slave terminal over power bus 309. As was described above with respect to the description of the general layout of a master terminal 101, the various peripheral components of the slave terminal 102, per se, do not form the subject of the invention, and this equipment will be briefly described only as necessary for completing the description of the communication system.

Figure 4:
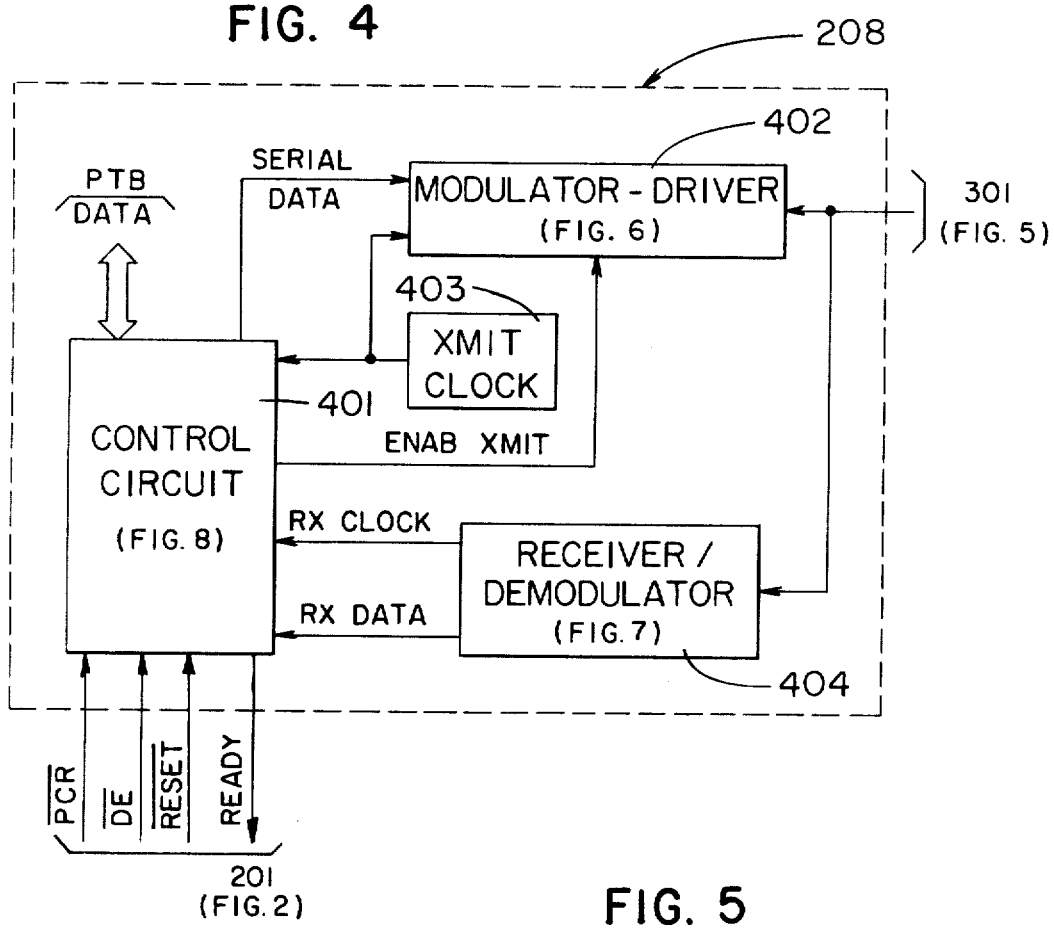
FIG. 4 is a circuit diagram of the master terminal bus adapter of FIG. 2.
Figure 5:
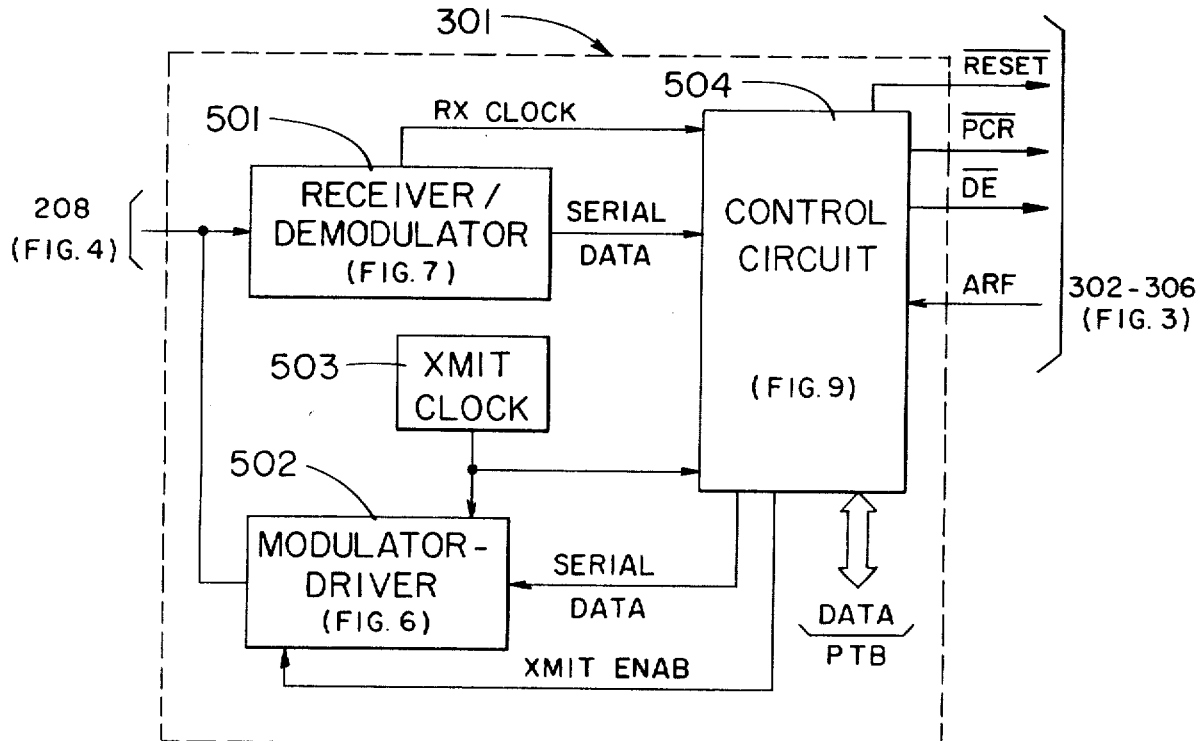
FIG. 5 is a circuit diagram of the slave terminal bus adapter of FIG. 3.

The basic circuitry of the respective master terminal and slave terminal bus adapters 208 and 301 is illustrated in FIGS. 4 and 5. Each adapter includes serial data modulation and driver circuitry for transmission to the receiver/demodulator of the bus adapter to which it is connected.

The master terminal bus adapter 208 contains a modulator-driver 402, a transmission clock 403, a receiver/demodulator 404, and a control circuit 401. The control circuit (the details of which will be described below with reference to FIG. 8) includes parallel/serial converter circuitry as well as protocol/control logic for interfacing the common control bus and the transmission lines to associated slaves. The control circuit 401 serializes the data to be transmitted to its associated slave terminals and controls the operation of the data modulator and driver 402 by a transmit enable signal ENABXMIT. The data is clocked out at the transmission rate generated by transmission clock 403.

Figure 6:
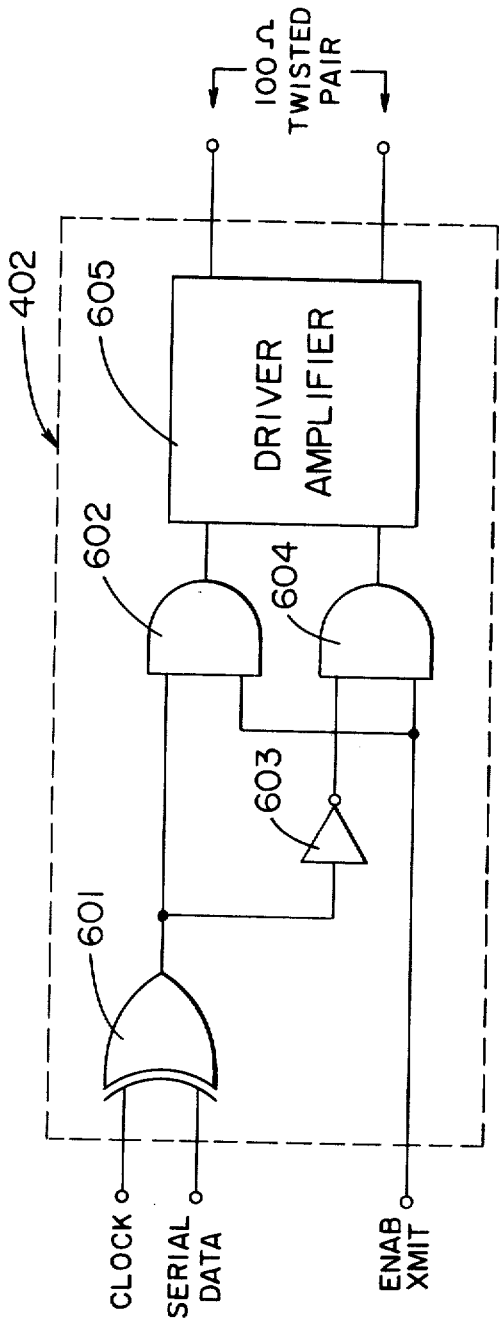
FIG. 6 is a schematic diagram of the modulator-driver circuitry used by the master and slave bus adapters of FIGS. 4 and 5, respectively.

The modulator driver 402, illustrated in FIG. 6, carries out Manchester coding and includes an exclusive-OR gate 601 which receives the serial data and the clock signal. The output of the exclusive-OR gate 601 is connected to one input of gate 602 and, through an inverter 603, to one input of gate 604. Gates 602 and 604 are enabled by the ENABXMIT signal from the master control circuit 401, thereby enabling the serial data to be supplied to driver amplifier 605 and clocked out over a 100Ω twisted pair line to the receiver/demodulation circuitry of the slave bus adapter 301.

Figure 7:
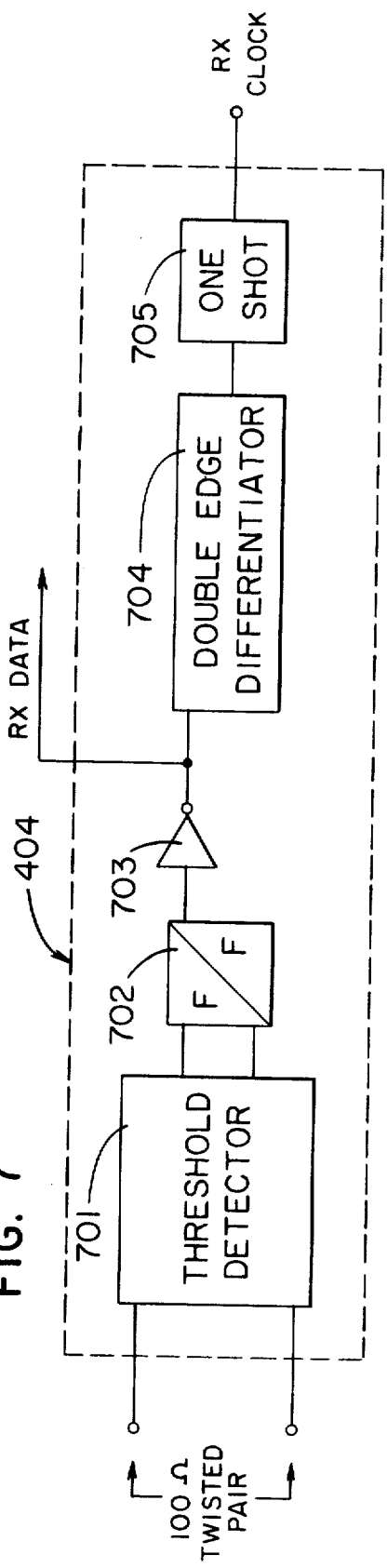
FIG. 7 is a schematic diagram of the receiver-demodulator circuitry used by the master and slave bus adapters of FIGS. 4 and 5, respectively.

When data is received from a slave bus adapter in response to a read instruction, the received signals are demodulated by receiver/demodulator 404, the details of which will now be described with reference to FIG. 7. The serial data clocked out from the bus adapter 301 at a slave terminal is supplied to a threshold detector 701 which, in turn, controls a flip-flop 702. One output of the flip-flop is coupled through an inverter 703 to a double-edge differentiator 704. The output of the inverter 703 is the received data and is supplied over line RX DATA to master control circuit 401. The received clock is generated by delaying the double-differentiated data signal through one-shot 705 and is coupled to control circuit 401 via line RX CLK.

Like the master terminal bus adapter 208, the slave terminal bus adapter 301 (FIG. 5) includes a modulator-driver 502, a receiver-demodulator 501, and a transmission clock 503. These components are structurally and operationally the same as those in the master terminal bus adapter so that the explanation given above for FIGS. 6 and 7 is applicable for components 501–503 in FIG. 5. The slave bus adapter 301 also includes a control circuit 504 (the details of which will be described below with reference to FIG. 9) for controlling the transmission of data from a peripheral device in response to a read request from the master terminal 101 and the writing of data into an addressed peripheral device.

The control circuits of the master terminal bus adapter and slave terminal bus adapter 301 are shown in detail in FIGS. 8 and 9, respectively. Included in these circuits are arrangements of combinational logic and parallel-serial/serial-parallel register circuitry for effecting the transmission of data between the central processor 107 and a slave terminal peripheral device 302–306 under the control of the master terminal 101. To simplify an understanding of the structure and operation of not only these circuits, per se, but the overall master-slave communication system of the invention, a description of the respective data transmissions which are implemented by the inventive system, under the control of the circuits of FIGS. 8 and 9, will be presented.

There are three basic types of communication transactions which can take place between the data processor (be it the host computer 107 or the common control module 201 of the master terminal 101) and a piece of peripheral equipment. One is a "write" transaction whereby a peripheral device is addressed and data from the processor is transmitted to and written into the peripheral device. Another is a "read" transaction whereby a peripheral device is addressed and data contained within the device is transmitted from the peripheral device to the processor. Still another is a "reset" transaction which occurs on power up and power down to initialize the processor and peripheral equipment so as to prevent transient noise from power up/down cycles from entering the peripheral devices and memory. Except for reset, these transactions will be described on an individual basis in accordance with the operations carried out by each of the master control circuits of FIG. 8 and the slave control circuit of FIG. 9, respectively.

MASTER CONTROL CIRCUIT (FIG. 8)

Data Format

The master terminal 101 transmits a word to a slave terminal 102 whenever an input/output (read or write) instruction is received from the processor 107 and the address designated corresponds to a non-protected address of the master terminal. As was described above, data is transmitted in serial format, so that from the master terminal there will be transmitted a series of bits which include, as part of the transmitted code, a field of address information specifying a particular slave terminal with which a transaction is to occur.

For purposes of illustration, a maximum code length of twenty bits is assumed, having a pair of sync bits ($S_1$, $S_2$), a reset false bit (RF), a read/write not bit ($R/\overline{W}$), an eight bit address field (A7-A0), and an eight bit data field (D7-D0). A twenty bit data format is transmitted by a master terminal for a write transaction or for a continuous reset transmission, and is coded as follows:

PTB as part of the common control bus for coupling the bits with the microprocessor of the common control module 201 (FIG. 2).

READ TRANSACTION

Figure 8A:
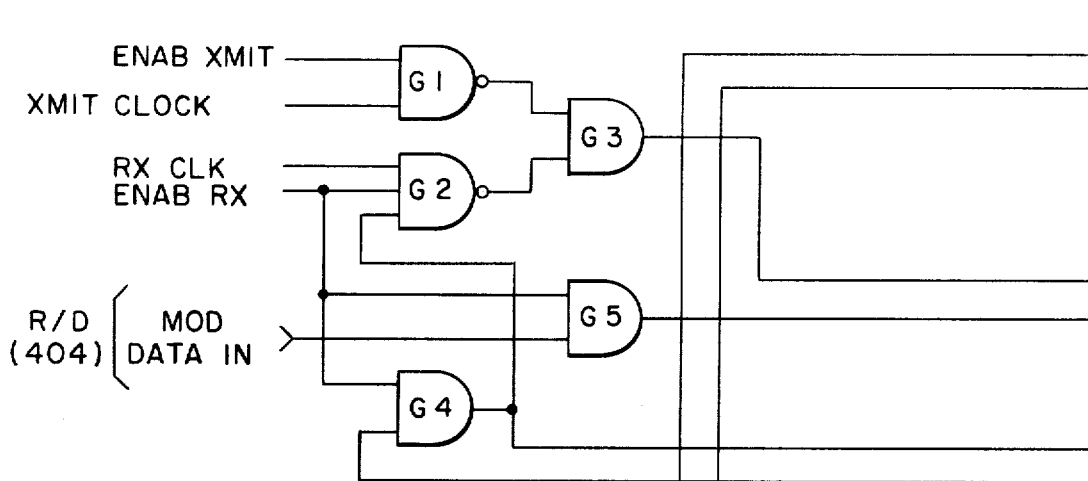
FIGS. 8A, 8B and 8C, taken together, are a schematic diagram of the control circuit of the master bus adapter of FIG. 4.
Figure 8A:
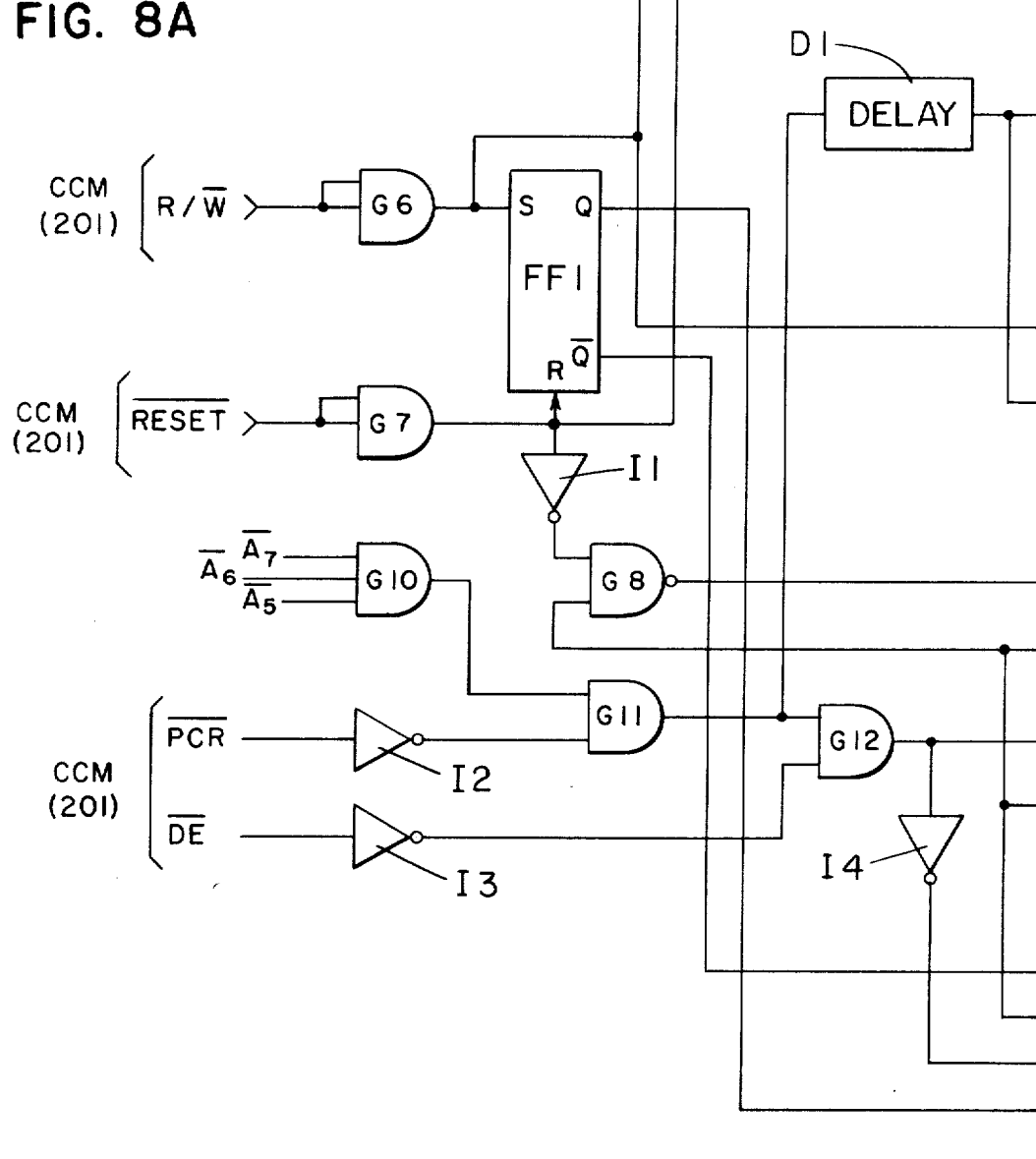
Figure 8B:
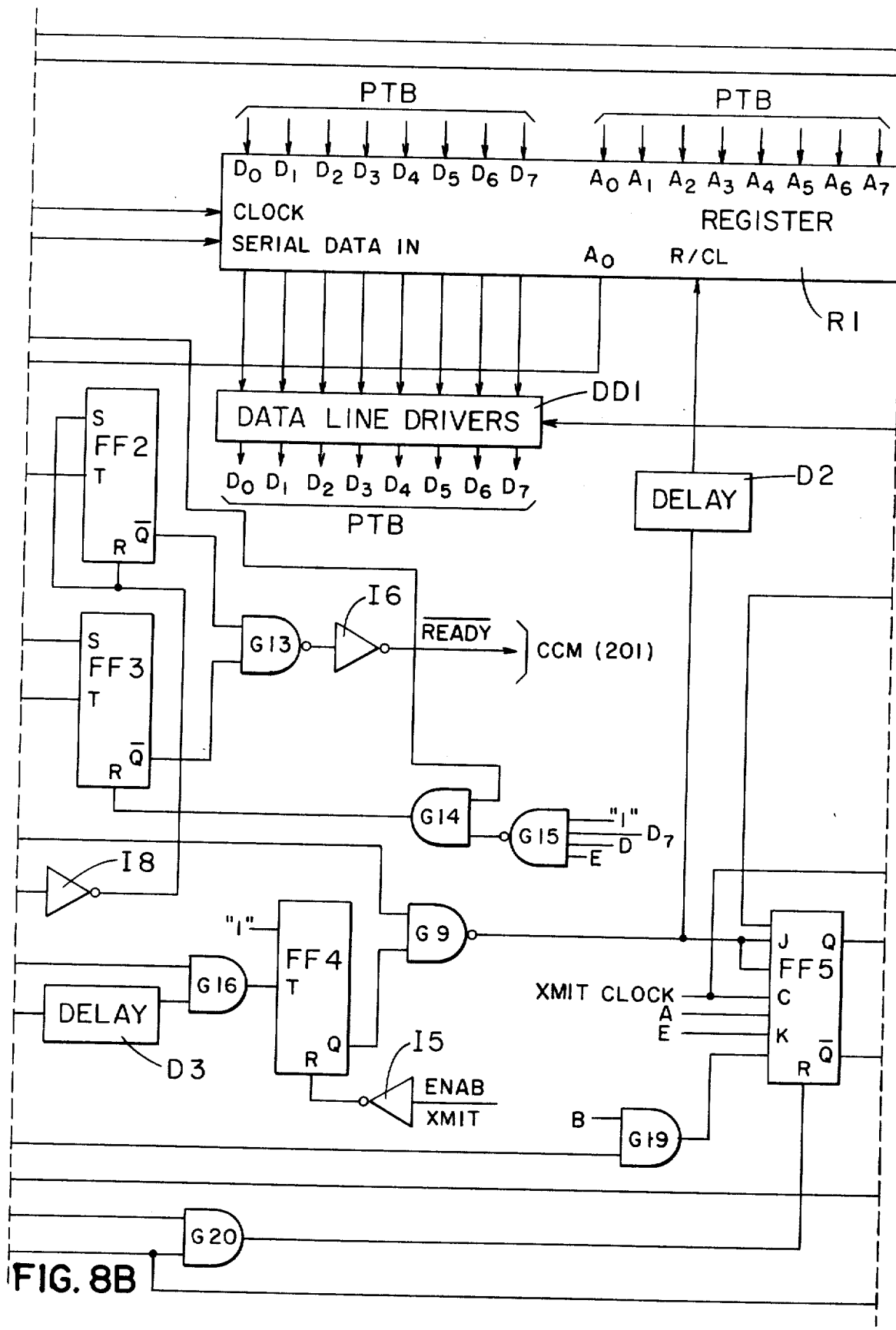
Figure 8C:
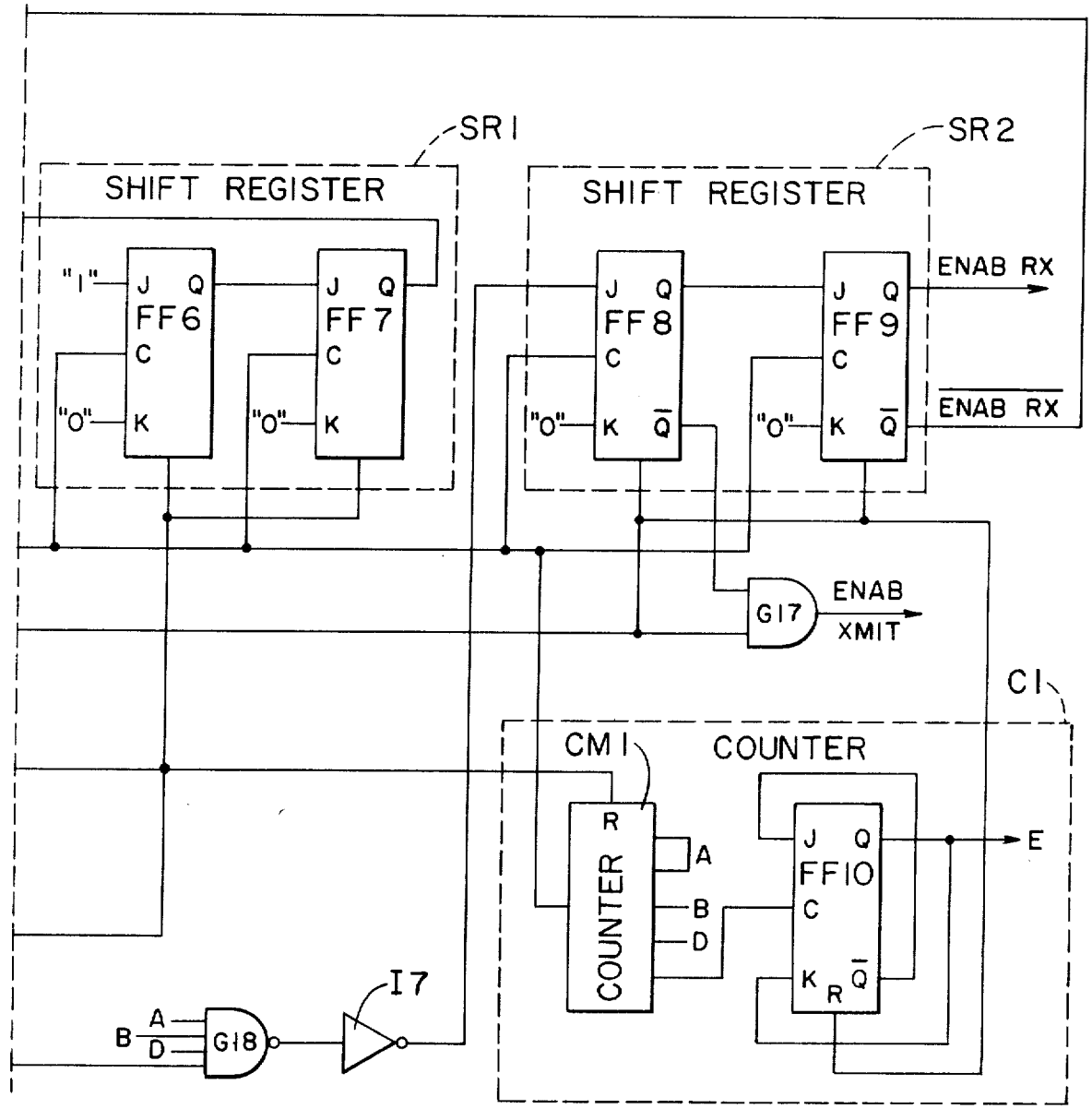

In the process of effecting a data exchange between a peripheral device and the processor 107, an initial examination is made to determine whether or not the peripheral device is capable of accepting information. Thus, before data can be written into a peripheral device, its status register is read to determine if the device can receive another word, and if it can, a write transaction will then proceed. Referring to FIG. 8 (made up of 8A, 8B and 8C), on the common control bus from the common control module (CCM) a "1" will be received at the $R/\overline{W}$ input to gate G6 and the $\overline{RESET}$ input to gate G7 will also be a "1" (FIG. 8A). Thus, the RF and $R/\overline{W}$ inputs to register R1 are both "1", the sync bits are strapped to "0" and "1" respectively, and the address of the peripheral to be read is supplied over bit lines $A_7$ through $A_0$. There are no data bits since the transaction is not a "write" transaction.

TRANSMIT MODE

The three most significant address bits ($A_7$, $A_6$ and $A_5$) are strapped through inverters (not shown) to the inputs of gate G10 (FIG. 8A) to effect a preselection of an available non-protected address field, i.e reserved for

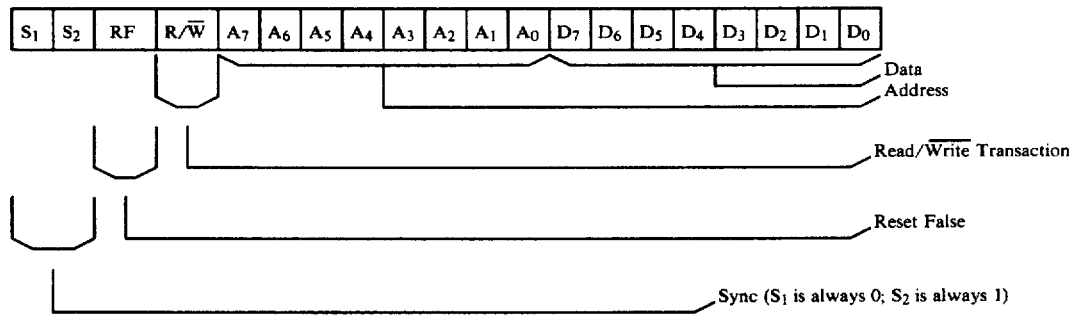

The control field of the twenty bit code consists of the reset false bit (RF) and the read/write not bit ($R/\overline{W}$). During a "write" transaction, the reset bit is a "1", while the read/write not bit is a "0". During a read transaction, since no data is sent to a slave terminal 102, the data bits are dropped, so that a twelve bit code will be transmitted from the master terminal 101. The reset false bit is again a "1", while the read/write not bit is a "1".

To create the respective read and write codes to be transmitted from the master terminal, the control circuit shown in FIG. 8 includes a parallel-serial/serial-parallel register R1 and a set of associated combinational logic. The register R1 is comprised of conventional cascaded registers, the stages of which are connected to accept a maximum of twenty parallel input bits $S_1$ through $D_0$ and to clock out these bits in serial format; similarly, the register R1 will receive a serial input data stream and selected stages, i.e. the data bit stages for $D_7$ through $D_0$ have their outputs connected to data line drivers DD1, from which parallel output data bits are obtained in response to the receipt of a serial data stream read out from a slave bus adapter 301. The address bits $A_7$ through $A_0$ and the data bits $D_7$ through $D_0$ are coupled to respective parallel lines of a portable bus connector peripheral devices 302-306 at the slave terminals 102. Of course, any appropriate number of address bits may be so strapped depending upon the system's requirements. In the present example, of the 255 available addresses, the protected addresses are addresses 0-63, reserved for master peripherals and prescribed system addresses, while addresses 64-255 (due to the $A_5$-$A_7$ bit strapping) are non-protected addresses reserved for slave peripheral devices. Proceeding on the assumption that there exists a peripheral device at the interrogated address and this device contains data, then the peripheral cycle request line $\overline{PCR}$ will be "0" and the data enable line $\overline{DE}$ will be "0" to enable gate G11 and, consequently, gate G12, through inverters I2 and I3. The output of gate G6 sets flip-flop FF1 and flip-flop FF3. The output of gate G11 is delayed by a one-shot delay D1 and toggles flip-flops FF2 and FF3. Since flip-flop FF3 has been set by gate G6, it is reset by the toggle to provide an output at $\overline{Q}$. The $\overline{Q}$ outputs of flip-flops FF2 and FF3 are coupled through gate G13 (FIG. 8B) and inverter I6 to the $\overline{READY}$ line.

The $\overline{READY}$ line is connected to the microprocessor of the common control module 201 through the common control bus 211 and is used to inhibit processing by the microprocessor under various conditions. First, upon a read command from the microprocessor, processing is inhibited, so as to allow data to be read from a slave terminal peripheral device and presented to the master terminal. Second, if a read command or another write command is attempted during a write transaction, processing will be inhibited throughout the remainder of the write transaction and throughout the read transaction but will resume when the current transaction is completed. The $\overline{Q}$ output of flip-flop FF2 inhibits processing through the $\overline{READY}$ line via gate G13 and inverter I6 if a transaction is still in progress, while flip-flop FF3 through its $\overline{Q}$ output inhibits processing during a read transaction. Flip-flop FF2 is cleared or reset by a transaction termination signal supplied through inverter I8, while flip-flop FF3 is cleared by gate G14, as will be described below.

thereby remove the ENAB XMIT signal from gate G1 and the driver modulator, so that data serialization is terminated. The second flip-flop stage (FF9) of the shift register SR2 receives a "1" with the next clock pulse, to enable the ENAB RX output line to gates G2 and G4 (FIG. 8A), so as to permit the master terminal to receive the data read out from the slave terminal. The flip-flop FF9 provides a one bit delay between the completion of the read transmission and enable receive signal ENAB RX.

RECEIVE MODE

With the ENAB RX input to gates G2 and G4 now enabled, the register R1 is now ready to receive data read out from a slave terminal 102. The only permissible data format transmitted by a slave terminal is a ten bit data code as follows:

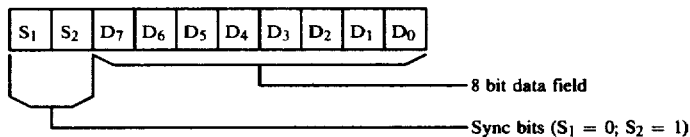

Proceeding, now, through the assumed transaction of reading a slave peripheral containing data, the output of gate G12 (FIG. 8A) is coupled through gate G16 to toggle flip-flop FF4 (FIG. 8B), which effectively synchronizes the operation of the data serialization process. Flip-flop FF4 will be reset via inverter I5 upon transmission of the data code to the slave terminal. Toggling of flip-flop FF4 causes a reset or clear signal to be supplied via gate G9 and delay D2 to the R/CL terminal of register R1 to clear and prepare the register to load and serialize data. Such reset or clear signal originates at the $\overline{RESET}$ output of gate G7 which is coupled through inverter I1 and gate G8 to gate G9.

Gate G9 (FIG. 8B) also enables the Q output of clocked JK flip-flop FF5, to clear the flip-flops FF8 and FF9 (FIG. 8C), which form a shift register SR2, and also clear the flip-flop FF10 of timing counter C1. Gate G17 is now enabled by the shift register SR2 and flip-flop FF5 to supply a transmission enable signal over line ENAB XMIT (FIG. 8C) to one input of gate G1 (FIG. 8A). The output of gate G1 is coupled through gate G3 to clock the data which has been parallel-loaded into register R1 out over the serial data output to the exclusive-OR gate 601 of the modulator-driver (shown in detail in FIG. 6). As a result, a twelve bit serial data stream consisting of the two sync bits ($S_1$="0"; $S_2$="1"), the reset bit (RF="1"), the read/write not bit (R/$\overline{W}$="1"), and eight address bits ($A_7$-$A_0$) will be transmitted to the slave terminals 102 associated with this particular master terminal 101.

Termination of the read transmission occurs after all the twelve bits of the data code have been serialized out of the register R1. The count of twelve is detected by the counter C1 (FIG. 8C), which counts the clock pulses supplied from the transmission clock via counter module CM1 and enables gate G18 (FIG. 8B) via lines A, B and D, with the fourth input to gate G18 being coupled to the Q output of flip-flop FF1 which was set, as described above, due to the occurrence of a read transaction. After the last or twelfth bit out from register R1 has been serialized out, gate G18 is enabled to set via inverter I7 the first flip-flop stage (FF8) of shift register SR2 (FIG. 8C), and gate G17 is disabled to (No control field or address field need be transmitted since the only transmission required from a slave terminal is a reply to an interrogation.) As the serial data train from the receiver/demodulator 404 (FIG. 4) is received at one input of gate G5, it is serially clocked by gates G2 and G3 into the cascaded stages of the register R1. The first bit loaded into register R1 is the "0" of the sync bit $S_1$ and the second bit loaded is the "1" of the sync bit $S_2$. When the second sync bit ($S_2$="1") is clocked into the ninth stage of the register (corresponding to the $A_0$ bit of the address field) all the data bits will have been clocked into the $D_0$-$D_7$ stages of the register and loading of the data read out from the addressed slave peripheral device is now completed. The $A_0$ bit now disables gate G4 to prevent further clocking of data via gates G2 and G3. At the same time, gate G4 causes flip-flop FF3 to be reset through gate G14, to enable the microprocessor of the common control module 201 via the $\overline{READY}$ line, so that the microprocessor can now read the data on the PTB lines $D_0$-$D_7$ from the date line drivers DD1.

To prevent the system operation from being delayed by a misoperation of a slave device, such as due to power loss, loss of sync, noise, etc., the logic is configured to permit the slave 102 only a prescribed amount of time to supply its data to the master terminal 101. To this end, selected outputs from the counter C1 and the $D_7$ bit from the register R1 are supplied to inputs of gate G15, which causes flip-flop FF3 to be reset through gate G14, so as to remove the common control module inhibit signal from the $\overline{READY}$ line. Namely, gate G15 and counter C1 provide a slave response time-out.

WRITE TRANSACTION

Transmit Mode

Completion of the read transaction means that the content status register of the peripheral device has been read and its associated output buffer is empty and ready to receive data from the common control module 201. The CCM now supplies a "0" on the R/$\overline{W}$ line input to gate G6, as opposed to a "1" for the read transaction described above. With flip-flop FF1 being reset by the output gate G7, which receives a "1" on input line RESET, the Q output of the flip-flop FF1 will be a "0", while its $\overline{Q}$ output will be a "1". Also, the set input of flip-flop FF3 is a "0", each of flip-flops FF2 and FF3 being again toggled by the output of delay D1. Otherwise, the initial conditions are the same as for a read transaction, so that a description of the same sequence of operations of the control circuit need not be repeated.

In addition to loading and serializing the sync, control and address fields, as occurred during a read transaction, the register R1 also loads and serializes eight data bits $D_0$–$D_7$ to produce a twenty bit data code to be transmitted to a slave terminal. As it did during a read transaction, counter C1 will count clock pulses from the transmission clock, and it terminates transmission after twenty clock pulses have been counted. This is accomplished by way of a connection from the $\overline{Q}$ output from flip-flop FF1 (FIG. 8A) to one input of gate G19 (FIG. 8B), and selectively connecting appropriate A, B and E outputs from the counter C1 corresponding to a count of twenty bits to the gate G19 and to the JK flip-flop FF5. Note that at the count of twelve, gate G18 is not triggered as it was during a read transaction, since the Q output of flip-flop FF1 is a "0"; therefore, no signal is present on the ENAB RX line. Once the twenty bit write code has been clocked out, the $\overline{Q}$ output of the JK flip-flop FF5 is coupled through inverter I8 and causes flip-flop FF2 to be cleared, which removes the inhibit signal from the $\overline{\text{READY}}$ line if one was present. The $\overline{Q}$ output of flip-flop FF5 is also coupled through gate G8, delay D3, gate G16, toggled flip-flop FF4 and gate G9 (FIGS. 8A and 8B) to prepare the system for the next transaction. The shift register SR1, comprising the flip-flop FF6 and FF7, is coupled to the JK flip-flop FF5 to provide a three bit dead time between words to allow slave terminals 102 to reset for the next transaction.

As was described previously, flip-flop FF2 inhibits the microprocessor of the CCM 201 if another transaction is attempted during a write transaction. Thus, if, during the above-described write transaction, the microprocessor was to attempt a read or write transaction, flip-flop FF2, whose reset input R is coupled through inverter I8 to the $\overline{Q}$ output of the JK flip-flop FF5, will inhibit processing, via the $\overline{\text{READY}}$ line, until the counter C1 detects a complete clocking out of data (twenty bits) and switches the $\overline{Q}$ output of flip-flop FF5. Of course, once that data has been serialized out to the master/slave link 103, flip-flop FF2 will no longer inhibit processing via the $\overline{\text{READY}}$ line, so that a new transaction may commence. Flip-flop FF5 is cleared by gate G20 via inverter I4 coupled to gate G12 (FIG. 8A).

SLAVE CONTROL CIRCUIT (FIG. 9)

Data Format

As was described above in connection with the construction and operation of the master control circuit 401, during a read transaction the slave control circuit 504 will receive a twelve bit code consisting of the bits: $S_1$, $S_2$, RF, R/$\overline{W}$, $A_7$, $A_6$, $A_5$, $A_4$, $A_3$, $A_2$, $A_1$, $A_0$, and will respond with a ten bit code consisting of the bits: $S_1$, $S_2$, $D_7$, $D_6$, $D_5$, $D_4$, $D_3$, $D_2$, $D_1$, $D_0$. During a write transaction, the slave terminal control circuit will receive a twenty bit code consisting of the bits: $S_1$, $S_2$, RF, R/$\overline{W}$, $A_7$, $A_6$, $A_5$, $A_4$, $A_3$, $A_2$, $A_1$, $A_0$, $D_7$, $D_6$, $D_5$, $D_4$, $D_3$, $D_2$, $D_1$, $D_0$ but no data is transmitted by the slave in reply. The slave control circuit 504 will be now described in connection with the two types of transactions (read and write).

READ TRANSACTION

Receive Mode

Figure 9B:
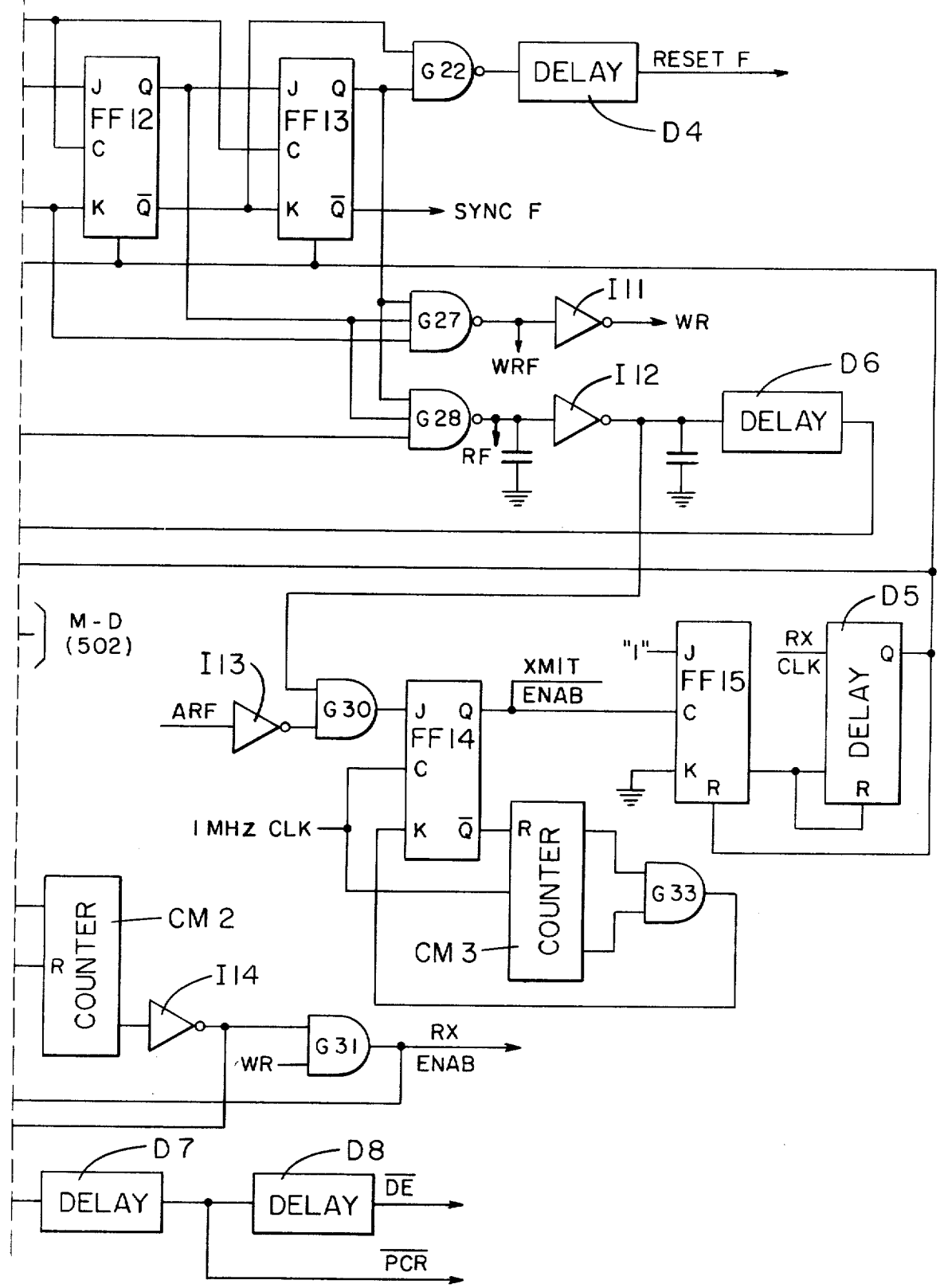

Referring now to FIG. 9, which is made up of 9A and 9B and shows the details of a slave control circuit, as the serial bit stream $S_1$, $S_2$, RF, R/$\overline{W}$, $A_7$, $A_6$, $A_5$, $A_4$, $A_3$, $A_2$, $A_1$, $A_0$ is demodulated by receiver demodulator 501 (FIG. 5) it is applied to the serial data inputs of registers R2 and R3 (FIG. 9A). Serial-parallel register R2 receives the serialized data from the master terminal and delivers the received address bits over parallel lines $A_0$–$A_7$ to the portable bus PTB, and through gate G21 via inverters I9 and I10 clocks the sync bit ($S_2$=1), the reset bit (RF=1), and the read/write not bit (R/$\overline{W}$=1) into flip-flop register stages FF11, FF12, and FF13. The $\overline{Q}$ output of flip-flop FF13 (FIG. 9B) is connected to gate G21 (FIG. 9A) via line SYNC F to insure synchronization of the system in accordance with "01" sync pattern of the $S_1$ and $S_2$ bits. Gate G22, which is, in effect, a decoder, detects the sync bits and, through delay D4, causes a delayed output to be supplied in line RESET F. The period of the delay D4 is longer than the rate at which words are supplied to the slave terminal, so that the RESET F line supplied, in effect, a continuous reset signal.

Also connected to the outputs of flip-flop FF11 through FF13 are a pair of decoding gates G27 and G28, which decode the control field to determine whether a read or write transaction is taking place. For the assumed read transaction, gate G28 supplies an output through invert I12 and gate G30, to cause the Q output of flip-flop FF14 to go high. The ouput of inverter I12 is also supplied to a one-shot delay D6, to initially clear register R3, so that it may load the data bits from the output buffer of the addressed peripheral device. A signal will be supplied on the ARF line (address recognize false) from a peripheral device to inverter I13 whenever a peripheral device associated with this slave terminal recognizes its address on lines $A_0$ through $A_7$ of the PTB. Assuming, of course, that there is an addressed peripheral device from whose output buffer data is to be read, then both inputs of gate G30 are enabled. A signal is now provided on the XMIT ENAB line from flip-flop FF14.

The output of gate G28, which decodes a read transaction, is also coupled (RF) through gate G32 to delays D7 and D8 which respectively provide the PCR and DE signals which are duplicates of the like named signals on the common bus, but are associated with the slave peripheral device bus in this instance.

TRANSMIT MODE

The XMIT ENAB output from flip-flop FF14 (FIG. 9B) via gates G24 and G25 (FIG. 9A), causes the serial-parallel/parallel-serial register R3 to serially clock out the sync bits ($S_1$=0, $S_2$=1) and the eight data bits ($D_7$–$D_0$) received from the output buffer of the addressed peripheral device, to the modulator driver 502 (FIG. 5) for transmission to the master terminal 101.

The Q output of flip-flop FF14 (FIG. 9B) also triggers flip-flop FF15 and delay D5, so that the stages of register R3 which receive the parallel data from the addressed slave peripheral, appearing at the $D_7$–$D_0$ inputs, will be cleared by gate G26 (FIG. 9A) after the data has been clocked out by the transmission clock signal XMIT CLK and the XMIT ENAB signals supplied to gate G24 and coupled through gate G25 to the clock input of register R3. Counter module CM3 (FIG. 9B) and gate G33 are connected to time out the clocking of the ten bit code serialized out of register R3, and then reset flip-flop FF14 causing the XMIT ENAB line to go low and terminate serialization by the register R3.

WRITE TRANSACTION (RECEIVE MODE)

For a write transaction from the master terminal 101, the full twenty bit code, described previously, will be supplied as a serial data train to registers R2 and R3. Since the R/$\overline{W}$ bit of the control field is a "0", the $\overline{Q}$ output of flip-flop FF11 is a "1", so as to enable gate G27 (FIG. 9B). The WRF output of gate G27 is supplied to counter module CM2 and to inverter I11. The WR output of inverter I11 enables gate G31, to supply a signal on line RX ENAB, so that, via gates G23 and G25 (FIG. 9A), register R3 will clock in the serial data bits $D_7$–$D_0$ and supply the data to data line drivers DD2. The parallel data bits $D_7$–$D_0$ are now written into the addressed peripheral device via the portable bus PTB.

The clock pulses received on the RK CLK input to gate G29 are counted until counter module CM2 counts that the eight data bits, $D_7$–$D_0$, have been clocked into register R3. Inverter I14 now inhibits the RX ENAB line, so that the received bits are no longer clocked through the stages of the register R3, and signals are generated on the $\overline{PCR}$ and $\overline{DE}$ outputs of delays D7 and D8 to clock the received data to the addressed slave device on the slave bus.

As will be appreciated by the foregoing description of the invention, read and write transactions can be conducted between a data processor and peripheral equipment by providing an interface data-retiming and transmission system which to the processor and to the peripheral is transparent. The interface handling of the data via the master and slave bus adapters requires no special knowledge by the processor and memory as to which peripheral devices are local and which are remote. The processor and memory can be confined to the master terminal containing the common control bus to the microprocessor. Also, due to the duplication of common bus signals at the slave bus, it is to be understood that the remote peripherals do not know whether they are on the same bus as the processor and memory or at a remote slave location.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A communications system for transmitting data between a data processor and a plurality of peripheral devices controlled by said processor comprising;

first interface means coupled over a first common bus to said processor and responsive to data transmission instructions including bus control signals and the address of a prescribed peripheral device supplied over said first common bus from the processor for generating a data code in accordance with the received data transmission instruction and which identifies the address of the peripheral device and the type of transaction to be carried out between said processor and said addressed peripheral device;

second interface means coupled over a second common bus to said plurality of peripheral devices addressable by said processor;

a transmission line connected between said first and second interface means;

said first interface means includes a first storage means for storing the data transmission instructions received from the processor over the first common bus and for outputting the data code when enabled;

first means for generating a transmission clock;

first circuit means responsive to receiving said bus control signals for generating a control signal;

first means coupled to said first clock generating means and said first circuit means for transmitting the data code at said transmission clock rate from said first storage means to said second interface means over said transmission line in response to the generation of said first control signal;

said second interface means includes means coupled to said transmission line for reconstructing said transmission clock from the transmitted data code;

second storage means coupled to said transmission line and said second common bus for storing the data code received from said first interface means;

second circuit means coupled to said second storage means and said second common bus for reconstructing from said transmitted data said bus control signals;

and third circuit means coupled to said second storage means and said clock reconstructing means for enabling said second storage means to output to the addressed peripheral device over said common bus said data code wherein the first and second interface means are transparent to the addressed peripheral device.

2. The communication system of claim 1 in which said first interface means includes fourth circuit means coupled to said first common bus and responsive to receiving said bus control signals for outputting over said first common bus a signal which inhibits a processing operation by said data processor during the transmission of data between the data processor and the addressed peripheral device.

3. The communication system of claim 1 in which said first circuit means includes first gating means responsive to receiving the address of the prescribed peripheral device enabling said transmission clock to transmit the data code from said first storage means to said second interface means when the address of the peripheral device is contained within only a preselected number of addresses available to be addressed by said processor.

4. The communications system of claim 1 in which said transmission line comprises a twisted pair of conductors, said first transmitting means is coupled to said first storage means and said first transmission clock generating means for transmitting the data code stored in said first storage means over the twisted pair of conductors at the rate of said transmission clock, and said second interface means includes a first receiver means coupled to said pair of conductors for receiving the data code transmitted by said first trans transmitting means, said receiver means includes said clock reconstructing means for reconstructing from the data code a clock signal corresponding to the transmission rate at which said data code is transmitted by said first transmitting means, said reconstructed clock enabling said second storage means to store said data code.

5. The communication system of claim 4 in which said second circuit means includes a plurality of bi-stable means coupled to said second storage means for reconstructing said common bus control signals in response to the storing of said data code in said second storage means.

6. The communication system of claim 5 in which said second storage means includes an address register for outputting the address of the prescribed peripheral device in said data code to the peripheral device and a data register for storing the data received from the prescribed peripheral device, said second interface means further including fifth circuit means responsive to a signal from the prescribed peripheral device whose address was outputted by said address register for transmitting the data stored in said data register to said first interface means.

7. The communication system of claim 6 in which said second interface means includes second means for generating said transmission clock, said second clock generating means coupled to said data register enabling said transmission clock to transmit the data code stored in said data register and received from the prescribed peripheral device to said first interface means.

8. A communications system for transmitting data between a data processor and a plurality of peripheral devices controlled by said processor comprising:

first adapter means coupled over a first common bus to said processor and responsive to parallel data transmission instructions including bus controls signals and the address of the prescribed peripheral device supplied over said first common bus from the processor for generating a serial data code in accordance with the received data transmission instructions and which includes the address of the prescribed peripheral device, the type of transaction and a data portion;

a plurality of second adapter means coupled over a second common bus to said plurality of peripheral devices addressable by said processor;

a twisted pair of conductors connected between said first adapter means and each of said second adapter means;

said first adapter means includes a first storage means coupled to said first common bus for storing said parallel data instructions and for outputting over said pair of conductors said serial data code when enabled;

first means coupled to said first storage means for generating a transmission clock;

first circuit means coupled to said first common bus and responsive to receiving said bus controls signals for enabling said transmission clock to clock said serial code from said first storage means over said twisted pair of conductors to each of said second adapter means;

each of said second adapter means includes means coupled to said twisted pair of conductors for reconstructing said transmission clock from the serial data code transmitted over said pair of conductors;

second storage means coupled to said pair of conductors for storing the address of the prescribed peripheral device, said second storage means further coupled to said reconstructing means and said second common bus for supplying over said second common bus at said recovered transmission clock rate the address of the prescribed peripheral device to the peripheral devices;

third storage means coupled to said clock reconstructing means for storing the data portion of the serial data code;

second circuit means coupled to said second storage means and said second common bus for reconstructing from the transmitted serial data code signal bus control signals;

and third circuit means coupled to said second and third storage means and said clock reconstructing means for enabling said third storage means to output in parallel said data portion to the addressed peripheral device over said second common bus in response to receiving the serial data code wherein the first and second adapters are transparent to the addressed peripheral device.

9. The communication system of claim 8 in which the data transmission instructions include a first data bit indicating the type of instruction supplied by the processor and said first adapter means includes fourth circuit means coupled to said first common bus and responsive to receiving said bus control signals and said data bit for outputting over said first common bus an inhibiting signal which inhibits a processing operation by said data processor during the transmitting of data between the data processor and the addressed peripheral device.

10. The communication system of claim 9 in which said first adapter means includes counter means operated in response to the outputting of the serial data code from said first storage means for terminating said inhibiting signal upon the expiration of a prescribed period of time.

11. The communication system of claim 8 in which said first circuit means includes gating means operated in response to receiving said bus control signal and the address of the prescribed peripheral device for allowing said transmission clock to enable said first storage means to output said serial data code to each of said second adapter means when the address of the peripheral device is contained within only a preselected number of addresses available to be addressed by said data processor.

12. The communication system of claim 8 in which said first adapter means includes a first transmitter means coupled to said first storage means and said first transmission clock generating means for transmitting the serial data code stored in said first storage means over the pair of conductors at the rate of said transmission clock to said second adapter, and each of said second adapter means includes a first receiver means coupled to said pair of conductors for receiving the serial data code transmitted by said first transmitting means and said second and third storage means, said receiver means including differentiator means and a one-shot multivibrator for reconstructing from the serial data code the transmission clock, and transmitting said clock to said second and third storage means whereby said recovered clock enables said second and third storage means to store said serial data code.

13. The communication system of claim 12 in which each of said second adapter means includes second means for generating said transmission clock, said second adapter means further including second transmitter means coupled to said third storage means, said second transmission clock generating means and said pair of conductors for transmitting data received from said addressed peripheral device and stored in said third storage means over the pair of conductors to said first adapter means at said transmission clock, and said first adapter means includes second receiver means for receiving the data transmitted by said second transmitter means, said second receiver means including second means for reconstructing the transmission clock from the transmitted data for use in transmitting the data to the data processor over the first common bus.

14. The communication system of claim 13 wherein said first and second transmitter means are structurally the same.

15. The communication system of claim 14 wherein said first and second receiver means are structurally the same.

16. The communication system of claim 15 in which each of said second adapter means includes fourth circuit means responsive to a second signal from the peripheral device whose address was stored in said second storage means for enabling said second transmission clock to output the data stored in said first storage means to said second transmitter means.

* * * * *